(12) United States Patent
Nichkawde

(10) Patent No.: US 10,740,391 B2
(45) Date of Patent: Aug. 11, 2020

(54) SYSTEM AND METHOD FOR GENERATION OF HUMAN LIKE VIDEO RESPONSE FOR USER QUERIES

(71) Applicant: WIPRO LIMITED, Bangalore (IN)

(72) Inventor: Chetan Nichkawde, Pune (IN)

(73) Assignee: Wipro Limited, Bangalore (IN)

(*) Notice: Subject to any disclaimer, the term of this patent is extended or adjusted under 35 U.S.C. 154(b) by 182 days.

(21) Appl. No.: 15/477,216

(22) Filed: Apr. 3, 2017

(65) Prior Publication Data
US 2018/0285456 A1    Oct. 4, 2018

(51) Int. Cl.
| | |
|---|---|
| *G06F 3/0484* | (2013.01) |
| *G06F 16/73* | (2019.01) |
| *G06N 3/08* | (2006.01) |
| *A63F 13/00* | (2014.01) |
| *G10L 13/04* | (2013.01) |
| *G11B 27/031* | (2006.01) |
| *G06N 3/04* | (2006.01) |
| *G10L 21/055* | (2013.01) |
| *G10L 21/003* | (2013.01) |

(Continued)

(52) U.S. Cl.
CPC .............. *G06F 16/73* (2019.01); *A63F 13/00* (2013.01); *G06N 3/0445* (2013.01); *G06N 3/0454* (2013.01); *G06N 3/0472* (2013.01); *G06N 3/08* (2013.01); *G10L 13/043* (2013.01); *G11B 27/031* (2013.01); *G10L 13/033* (2013.01); *G10L 21/003* (2013.01); *G10L 21/055* (2013.01); *H04R 3/00* (2013.01)

(58) Field of Classification Search
CPC ..... G06K 9/00268; G06K 2009/00328; G06K 9/00248; G06K 9/00302; G06K 9/00335
See application file for complete search history.

(56) References Cited

U.S. PATENT DOCUMENTS

| | | | |
|---|---|---|---|
| 4,115,768 A | * | 9/1978 | Eggenberger .......... H03M 7/00 341/59 |
| 2007/0074114 A1 | | 3/2007 | Adjali et al. |
| 2010/0211397 A1 | | 8/2010 | Park et al. |

(Continued)

OTHER PUBLICATIONS

Assael, Y.M. et al., "Lipnet: End-to-End Sentence-Level Lipreading", *Department of Computer Science*, Dec. 16, 2016, pp. 1-13.

(Continued)

*Primary Examiner* — Namitha Pillai
(74) *Attorney, Agent, or Firm* — Finnegan, Henderson, Farabow, Garrett & Dunner, LLP

(57) ABSTRACT

Disclosed herein is a method and a video generator for generating video response to user queries. The video generator receives a visual image of a character of interest from the user and generates a frontal face of the visual image. Further, facial expressions of the character of interest are mapped with an audio/video sequence of one or more textual responses for generating a human like video response to the user queries. In an embodiment, the video generator detects gender of the character of interest, and modulates and matches voice of the video response based on the gender of the character of interest. The instant method can synthesize a video with the face of a character of interest to the user, thereby providing a wholesome communication experience to the user.

13 Claims, 6 Drawing Sheets

(51) Int. Cl.
*G10L 13/033* (2013.01)
*H04R 3/00* (2006.01)

(56) References Cited

U.S. PATENT DOCUMENTS

2012/0130717 A1* 5/2012 Xu .................... G06T 13/40
  704/258
2018/0137137 A1* 5/2018 Jin ................. G06F 16/3334

OTHER PUBLICATIONS

Vondrick, C. et al., "Generating Videos with Scene Dynamics", *29th Conference on Neural Information Processing Systems (NIPS)*, Oct. 26, 2016, pp. 1-10.

* cited by examiner

SYSTEM AND METHOD FOR GENERATION OF HUMAN LIKE VIDEO RESPONSE FOR USER QUERIES

TECHNICAL FIELD

The present subject matter is related, in general to audio-video response system, and more particularly, but not exclusively to a system and method for generation of human like video response for user queries.

BACKGROUND

Presently, virtual assistant systems are not capable of mimicking and simulating a human-to-human communication experience. A virtual assistant which is engaged in a dialogue with a human being should be able to present a human like interface, having a match between facial expression, eye movement and lip movement and utterances communicated during the dialogue.

Further, the personality and other characteristics such as gender of the virtual assistant should be able to match with the user's preferences. Ideally, the user should be able to Interact with the virtual assistant as if it were a real interaction. This may be necessary to provide a wholesome communication experience to the user.

SUMMARY

Disclosed herein is a method for generating video response for user queries. The method comprises receiving, by a video generator, a visual image of a character of interest from the user. Upon receiving the visual image, a frontal face of the character of interest is generated. Further, the method comprises generating an audio sequence and a video sequence for one or more predetermined textual response generated in response to the user queries. The video sequence is mapped to one or more facial expressions of the character of interest. Finally, the method comprises generating the video response by combining the video sequence and the audio sequence.

Further, the present disclosure discloses a video generator for generating video response for riser queries. The video generator comprises a processor and a memory. The memory is communicatively coupled to the processor. The memory stores processor-executable instructions, which, on execution, causes the processor to receive a visual image of a character of interest from the user. Upon receiving the visual image, the processor generates a frontal face of the character of interest. Further, the processor generates an audio sequence and a video sequence for one or more predetermined textual response generated in response to the user queries with matching facial expressions. Finally, the processor generates the video response by combining the video sequence and the audio sequence.

Furthermore, the present disclosure discloses a non-transitory computer readable medium including instructions stored thereon that when processed by at least one processor cause a video generator to receive a visual image of a character of interest from the user. Upon receiving the visual image, the instructions cause the processor to generate a frontal face of the character of interest. Further, the instructions cause the processor to generate an audio sequence and a video sequence for one or more predetermined textual response generated in response to the user queries with matching facial expressions. Finally, the instructions cause the processor to generate the video response by combining the video sequence and the audio sequence.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF DRAWINGS

The accompanying drawings, which are incorporated in and constitute a part of this disclosure illustrate exemplary embodiments and, together with the description, explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject, matter are now described, by way of example only, and with reference to the accompanying figures, in which.

Figure 1:
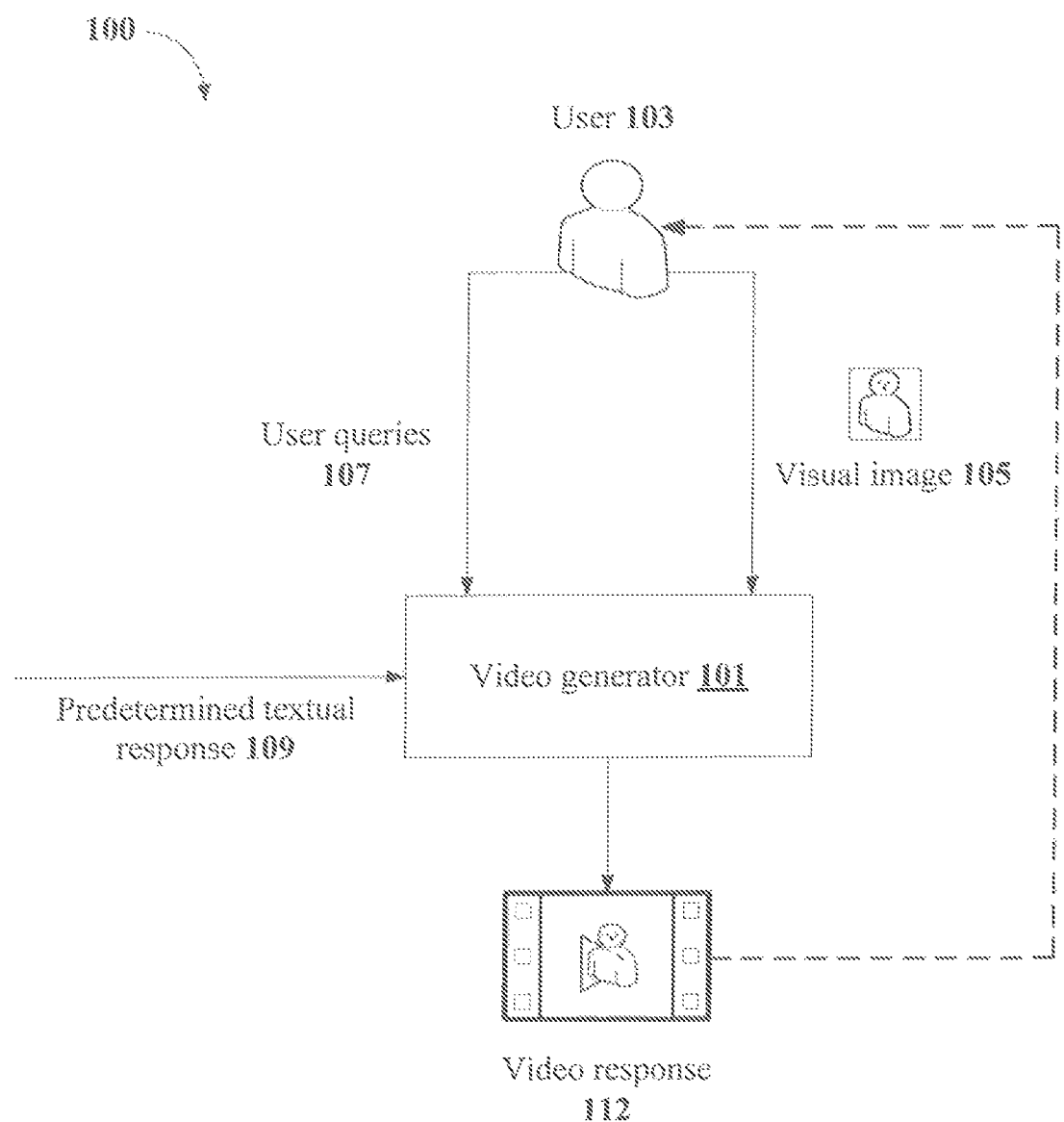
FIG. 1 shows an exemplary environment for generating video response for user queries in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the specific forms disclosed, but on the contrary, the disclosure is to cover ail modifications, equivalents, and alternative falling within the spirit and the scope of the disclosure.

The terms "comprises", "comprising", "includes", "including" or any other variations thereof, are intended to cover a non-exclusive inclusion, such that a setup, device or method that includes a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure relates to a method and a video generator system for generating video response to user queries. The method uses a sequence-to-video modeling paradigm to generate appropriate facial expressions, which would be in sync with communication utterances. In an embodiment, the video generator may be trained based on various audio-visual-textual data. This may be further be augmented using a text-to-audio conversion technique that would translate the textual communication to audio forms using technologies such as WaveNet neural network.

In an embodiment, the video generator may receive a visual image of a character of interest from the user. Upon receiving the visual image, the video generator may generate a frontal face of the visual image. As an example, the frontal face of the character of interest may include a front view of the face of the character of interest indicating relative positions of various parts of the face. Further, the frontal face may be mapped with an audio/video sequence of one or more textual responses for generating a human like video response to the user queries, such that the video response has a match between the lip movement and pronunciation corresponding to the one or more predetermined textual responses. In an embodiment, the video generator detects gender of the character of interest, and modulates and matches voice of the video response based on the gender of the character of interest.

The method and the video generator disclosed herein may synthesize a video with the face of a character of interest to the user, thereby providing a wholesome communication experience to the user. Further, the present disclosure may help in building a cognitive agent that interacts with the user to resolve his/her queries and issues, thereby providing a virtual assistance system for carrying out human-to-human like communications.

In the following detailed description of the embodiments of the disclosure, reference is made to the accompanying drawings that form apart hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 shows an exemplary environment for generating video response 112 for user queries 107 in accordance with some embodiments of the present disclosure.

Accordingly, the environment 100 includes a user 103 and a video generator 101. The video generator 101 may receive one or more user queries 107 and a visual image 105 front the user 103. As an example, the one or more user queries 107 may include one or more domain specific questions that the user 103 wants to clarify. In an embodiment, the visual image 105 may be an image of a person or a character which is of interest to the user 103. As an example, the character of interest may be one of favorite actors/actresses of the user 103, favorite movie character of the user 103 and the like.

In an embodiment, upon receiving the visual image 105 from the user 103, the video generator 101 may generate a frontal face of the character of interest in the visual image 105. As an example, the frontal face of the character of interest may include a front view of the face of the character, indicating relative positions of various parts such as nose, eyes, and the like, of the face.

Further, the video generator 101 may use one or more predetermined textual response 109 corresponding to the one or more user queries 107 and generate a video sequence 111 for the one or more predetermined textual response 109. As an example, the one or more predetermined textual response 109 may be generated and stored in a response repository associated with the video generator 101 and each of the one or more predetermined textual response 109 correspond to the one or more user queries 107. Accordingly, whenever the one or more user queries 107 are received from the user 103, the video generator 101 may dynamically pick-up one of the one or more predetermined responses from the response repository for generating an appropriate video sequence 111.

Upon generating the video sequence 111 corresponding to the one or more predetermined textual response 109, the video generator 101 may map the video sequence 111 to the one or more facial expressions, thereby synthesizing the video sequence 111 with the frontal face of the character of interest. Finally, the video generator 101 generates the video response 112 by combining the video sequence 111, which is mapped with the frontal face, with the audio sequence 110. In an embodiment, the video generator 111 may synchronize the audio sequence 110 with the one or more facial expressions of the character of interest to match utterances in the audio sequence 110 with the lip and eye movement of the character of interest.

In some implementations, the video generator 101 may dynamically determine gender of the character of interest in the visual image 105 for modulating vocal rhythm and/or voice of the audio sequence 110 as per the gender of the character of interest.

Figure 2:
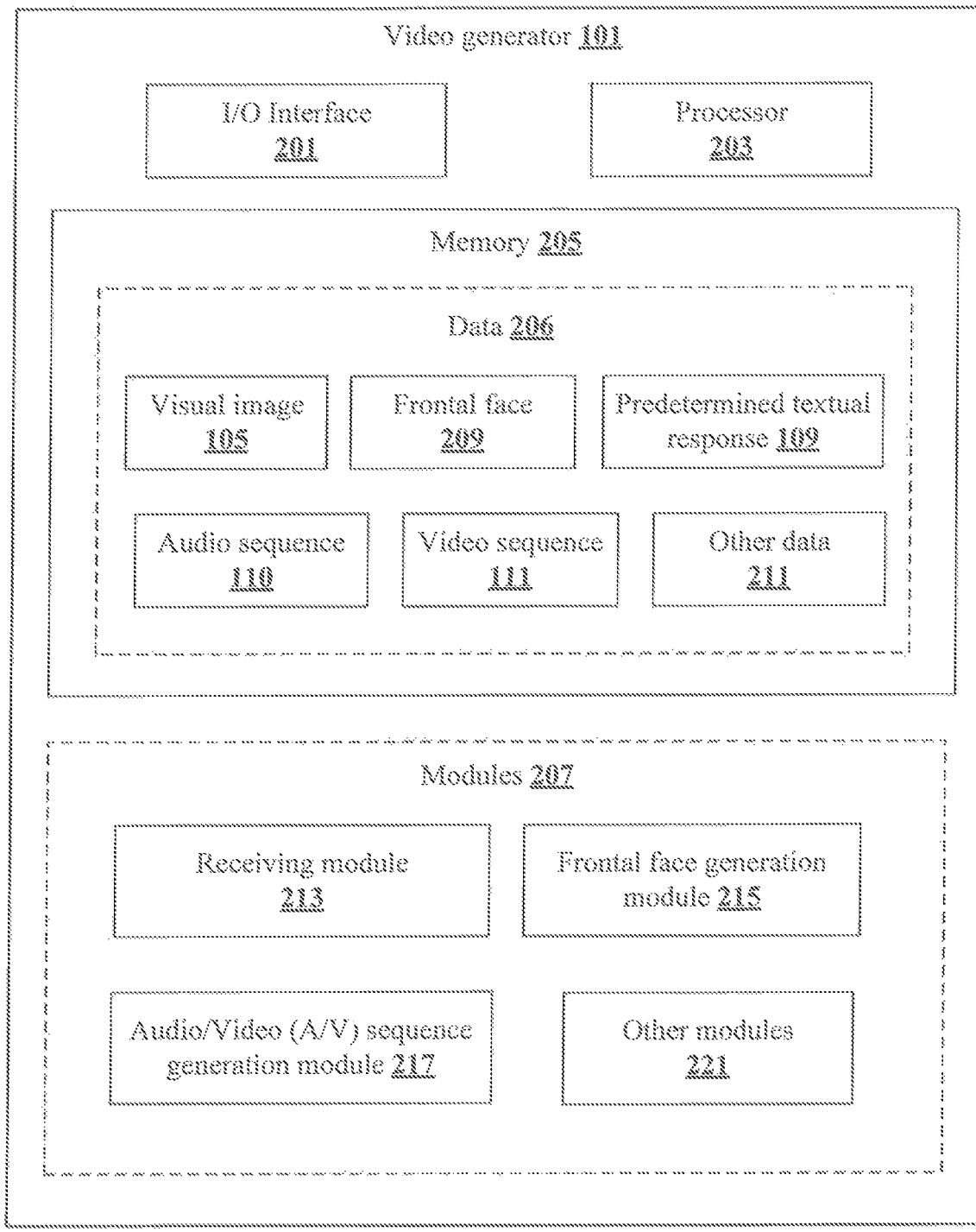
FIG. 2 shows a detailed block diagram illustrating a video generator for generating video response for user queries in accordance with some embodiments of the present disclosure.

FIG. 2 shows a detailed block diagram illustrating a video generator 101 for generating video response 112 for user queries 107 in accordance with some embodiments of the present disclosure.

The video generator 101 may include an I/O interface 201, a processor 203 and a memory 205. The I/O interface 201 may be used for receiving one or more user queries 107 and the visual image 105 from the user 103. The memory 205 may be communicatively coupled to the processor 203. The processor 203 may be configured to perform one or more functions of the video generator 101 for generating video response 112 of the user queries 107. In one implementation, the video generator 101 may include data 206 and modules 207, which are used for performing various operations in accordance with the embodiments of the present disclosure. In an embodiment, the data 206 may be stored within the memory 265 and may include, without limiting to, the visual images 105, a frontal face 209 of the character of interest, one or more predetermined textual response 109, an audio sequence 110, a video sequence 111, and other data 211.

In some embodiments, the data 206 may be stored within the memory 205 in the form of various data structures. Additionally, the data 206 may be organized using data models, such as relational or hierarchical data models. The other data 211 may store data, including temporary data and temporary files, generated by modules 207 while generating the video response 112 for the user queries 107.

In some embodiment, the visual image 105 may be received from the user 103. In an embodiment, the visual image 105 may be a photograph of a character of interest to the user 103. As an example, the character of interest may be favorite actors/actresses of the user 103, favorite movie characters of the user 103 and the like, in some implementations, the visual image 105 may be received in various formats, without limiting to, an image, a video clip and the like.

In an embodiment, the frontal face 209 of the character of interest may be generated from the visual image 105 of the user 103. As an example, the frontal face 209 of the character of interest may include a front view of the face of the character, indicating relative positions of various parts such as nose, eyes, and the like, of the face.

In an embodiment, the one or more predetermined textual response 109 may be generated in response to the one or more user queries 107 received form the user 103. The one or more predetermined textual response 109 may be stored in a response repository associated with the video generator 101. Further, the response repository may be dynamically updated by generating and storing responses to the one or more user queries 107, which were not handled by the video generator 101 previously. In some implementations, the one or more predetermined textual response 109 may be fetched from external knowledge databases such as encyclopedia, research journals and the like.

In an embodiment, the audio sequence 110, and the video sequence 111 may be generated corresponding to the one or more predetermined textual response 109. The one or more predetermined textual response 109, which is in the text data format, is translated into video format/video sequence 111. Similarly, the predetermined textual response 109 may be converted into audio sequence 110 by recording the utterances of the one or more predetermined textual response 109. Then, the generated video sequence 111 may be mapped with the facial expressions of the character of interest before combining the video sequence 111 with the audio sequence 110 for generating the video response 112.

In some embodiments, the data 206 may be processed by one or more modules 207 in the video generator 101. In one implementation, the one or more modules 207 may be stored as a part of the processor 203. In another implementation, the one or more modules 207 may be communicatively coupled to the processor 203 for performing one or more functions of the video generator 101. The modules 207 may include, without limiting to, a receiving module 213, a frontal lace generation module 215, an Audio/Video (A/V) sequence generation module 217, and other modules 221.

As used herein, the term 'module' may refer to an application specific integrated circuit (ASIC), an electronic circuit, a processor (shared, dedicated, or group) and memory that execute one or more software or firmware programs, a combinational logic circuit, and/or other suitable components that provide the described functionality. In an embodiment, the other modules 221 may be used to perform various miscellaneous functionalities of the video generator 101. It will be appreciated that such modules 207 may be represented as a single module or a combination of different modules.

In an embodiment the receiving module 213 may be responsible for receiving the one or user queries 107 and the visual image 105 of the character of interest from the user 103. The one or more user queries 107 may be received in various forms including, without limiting to, text inputs, user utterances, gestures, and the like. In an implementation, if the one or more user queries 107 are received in a non-textual format, the receiving module 213 may translate the one or more user queries 107 to textual format.

In an embodiment, the frontal face generation module 215 may be responsible for generating the frontal face 209 of the character of interest from the visual image 105 using any of existing techniques for generating the frontal face 209 of a given visual image 105. Accordingly, the frontal face generation module 215 may process the visual image 105 of the character of interest using various image processing techniques to extract key facial characteristics and expressions from the visual image 105. Later, the key facial characteristics and expressions may be further analyzed to generate the frontal face 309 of the character of interest.

Further, the frontal face generation module 215, using a frontal face 209 synthesis unit, may randomly pick up a video frame and synthesize the frontal face 209 of the character of interest from the video frame. The frontal face generation module 215 would take the visual image 105 of the character of interest as the input and generate a frontal face 209, which would further be used downstream by the video generator 101 while generating the video response 112.

In an embodiment, the A/V sequence generation module 217 may be responsible for generating the audio sequence 110 and the video sequence 111 for the one or more predetermined textual response 109. In an embodiment, the video sequence 111 generated by the A/V sequence generation module 217 may be synthesized based on the frontal face 209 for embedding the facial expressions of the character of interest in the video sequence 111. Further, based on the gender of the character of interest, the voice and/or the vocal rhythm of the voice being used in the audio sequence 110 may be varied.

In an embodiment, the video generator 101 may match the video sequence 111 with the facial expressions of the character of interest in the visual image 105 while generating the video response 112. In some implementations, the matching/mapping of the video sequence 111 with the facial expressions of the character of interest may be based on training an interacting framework of Convolutional Neural Network (CNN) image encoder, a convolutional Long Short-Term Memory (LSTM) video encoder, a Gated Recurrent Unit (GRU) encoder and a Conditional Pixel CNN (CPCNN) decoder using training data.

In an embodiment, the video generator 101 may include an encoder-decoder logic, in which the textual input or the one or more predetermined response is transformed into learnt numerical vector representation, in a character-by-character scanning manner. Further, the video generator 101 may feed the numerical vector representation of the one or more predetermined response or the textual input to a Recurrent Neural Network (RNN), such as those composed of Gated Recurrent Unit (GRU), which would encode the textual utterance into its hidden state.

In some implementations, the vide generator 101 may include a convolutional LSTM neural network video encoder, which learns and generates the video sequence 111 corresponding to the input texts or the one or more predetermined responses. Further, the video generator 101 may establish a match/synchronization between the utterance of the one or more predetermined response and lips and eye movement of the character of interest in the frontal face 209.

Figure 3A:
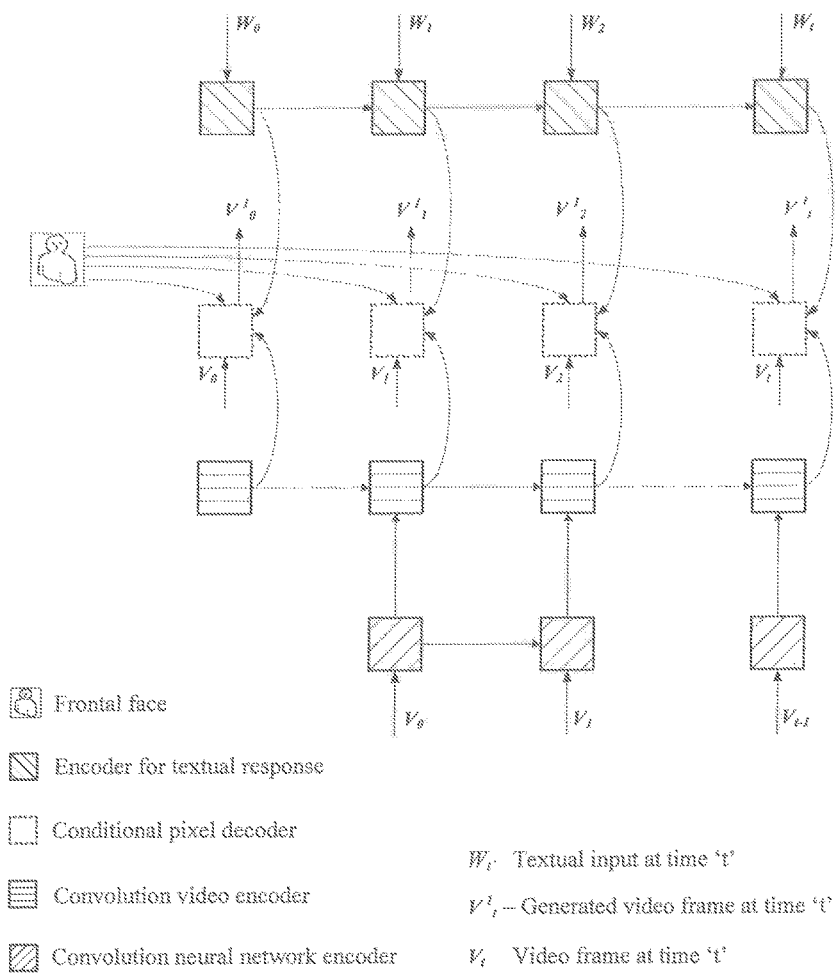
FIGS. 3A and FIG. 3B are neural network architecture diagrams illustrating training of the video generator to generate the video response using textual-audio-video data and functioning of the trained video generator to respond to the user queries in accordance with an exemplary embodiment of the present disclosure.
Figure 3B:
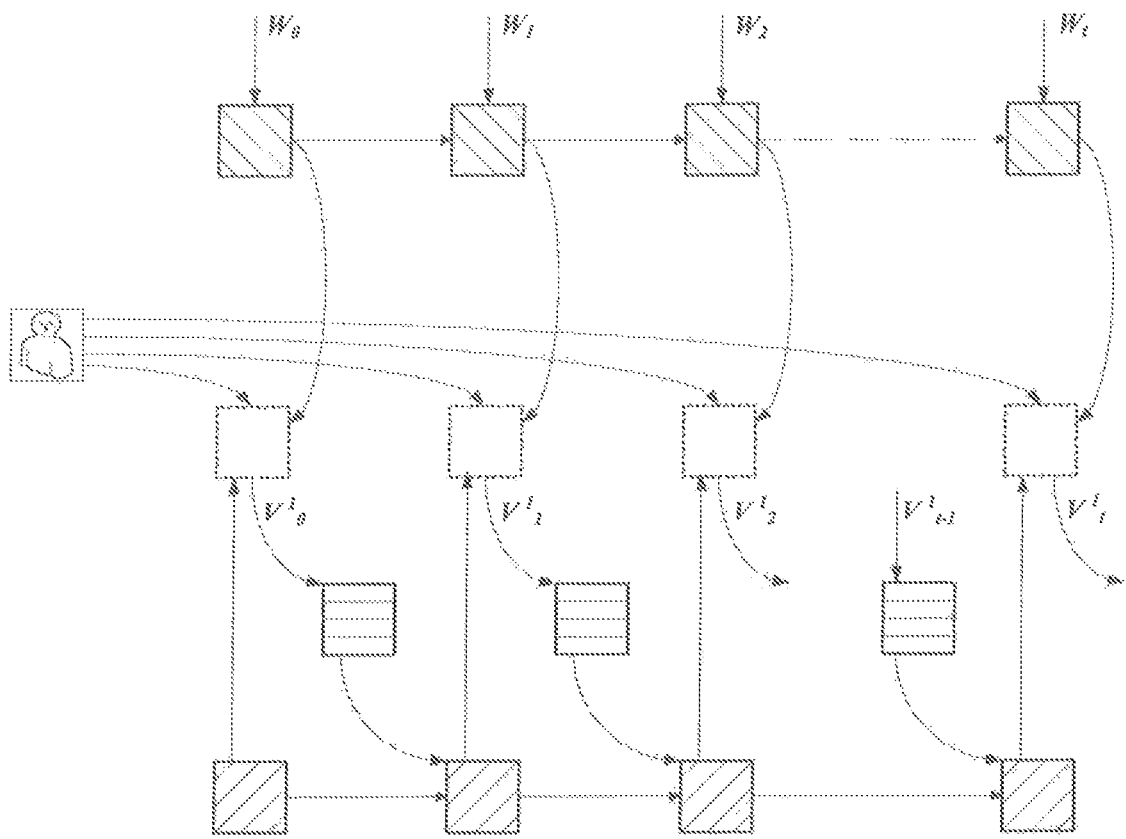

FIG. 3A and FIG. 3B neural network architecture diagrams illustrating training of the video generator 101 to generate the video response 112 using textual-audio-video data and functioning of the trained video generator 101 to respond to the user queries 107 in accordance with an exemplary embodiment of the present disclosure.

As discussed in the above section, the video generator 101 may include an encoder-decoder logic and that the video generator 161 learns to translate the one or more predetermined response into an appropriate video having the face of the character of interest with matching facial expressions such as, movement of lips and eye. The one or more predetermined response may further include symbolic token sequences that are produced during representation of characters in a dictionary and may be embedded in a higher dimensional continuous real-valued vector space. Later, the embedded vector train may be used to drive a Textual GRU (TGRU) based RNN that may encode a sentence within an internal state of its neurons.

Further, as indicated in FIG. 3A and FIG. 3B, a Convolutional Neural Network Encoder (CNNE) in the video generator 101 may consider each individual video frames in the video sequence 111 and may encode an internal state of each of the video frames. These encoded video frames are further provided as an input, in a time sequence, to a Convolutional Long Short Memory Video Encoder (CLSTMVE). The CLSTMVE is a RNN and therefore takes the previous state in time also as an input and produces a next state in time. In an embodiment, the hidden state of the CLSTMVE may be fed as input to a Conditional Pixel Convolutional Neural Network Decoder (CPCNND).

Further, the CPCNND may take the synthesized frontal face 209 and the current state of the TGRU as inputs. The CPCNND may try to recreate the input video frame at the current time step. Also, a learning module associated with the video generator 101 may try to minimize error between the input video frame and the generated video frame by fine-tuning all system parameters using Stochastic Gradient Descent (SGD).

$$p(x) = \prod_{t=0}^{t} \prod_{i=0}^{N} \prod_{j=0}^{N} p(x_{t,i,j} | x_<, x_{CLSTMVE_<}, x_{TGRU_<}, x_{frontal\_face}) \quad (1)$$

Equation (1) above mathematically represents probability of a video p(x), where, '$P_{t,i,j}$' represents a value of the pixel located at a location 'i,j' in an N×N frame at time 't'.

'$x_<$' represents set of all pixels having location less than i and j and the pixels of all video frames for time less than t.

'$x_{CLSTMVE_<}$' represents the state of CLSTMVE for all time less than t.

',$x_{TGRU_<}$' represents the state of TGRU for ail time less than t and

'$x_{frontal,face}$' represents the pixels of the synthesized frontal lace 209.

Finally, a conditional pixel decoder in the video generator 101 may take in the output of the TGRU and generate the audio sequence 110 corresponding to the one or more predetermined response. As an example, the conditional pixel decoder may use the Wave Net architecture for generating the audio sequence 110.

In an embodiment, upon completion of learning and mapping by the video generator 101, the module may be used to generate the video response 112. In an implementation, the character tokens in the video response 112 may be mapped to their symbols to produce a sequence of symbolic tokens. These symbolic tokens may be embedded into the learnt vector space and fed as input to the trained TGRU. Further, the CPCNND may take the output of TGRU at a current time step, the frontal face 309 of the character of interest and a current state of CLSTMVE as inputs and generates the next video frame. The generated next video frame may be fed as an input to the CNNE and subsequently, as an input to the CLSTMVE, which produces a next state of time. This next state of time may be once again fed to the CPCNND to generate the next video frame in the video sequence 111. The above process may be repeated until ad the video frames have been generated and the complete video sequence 111 is obtained.

Figure 4:
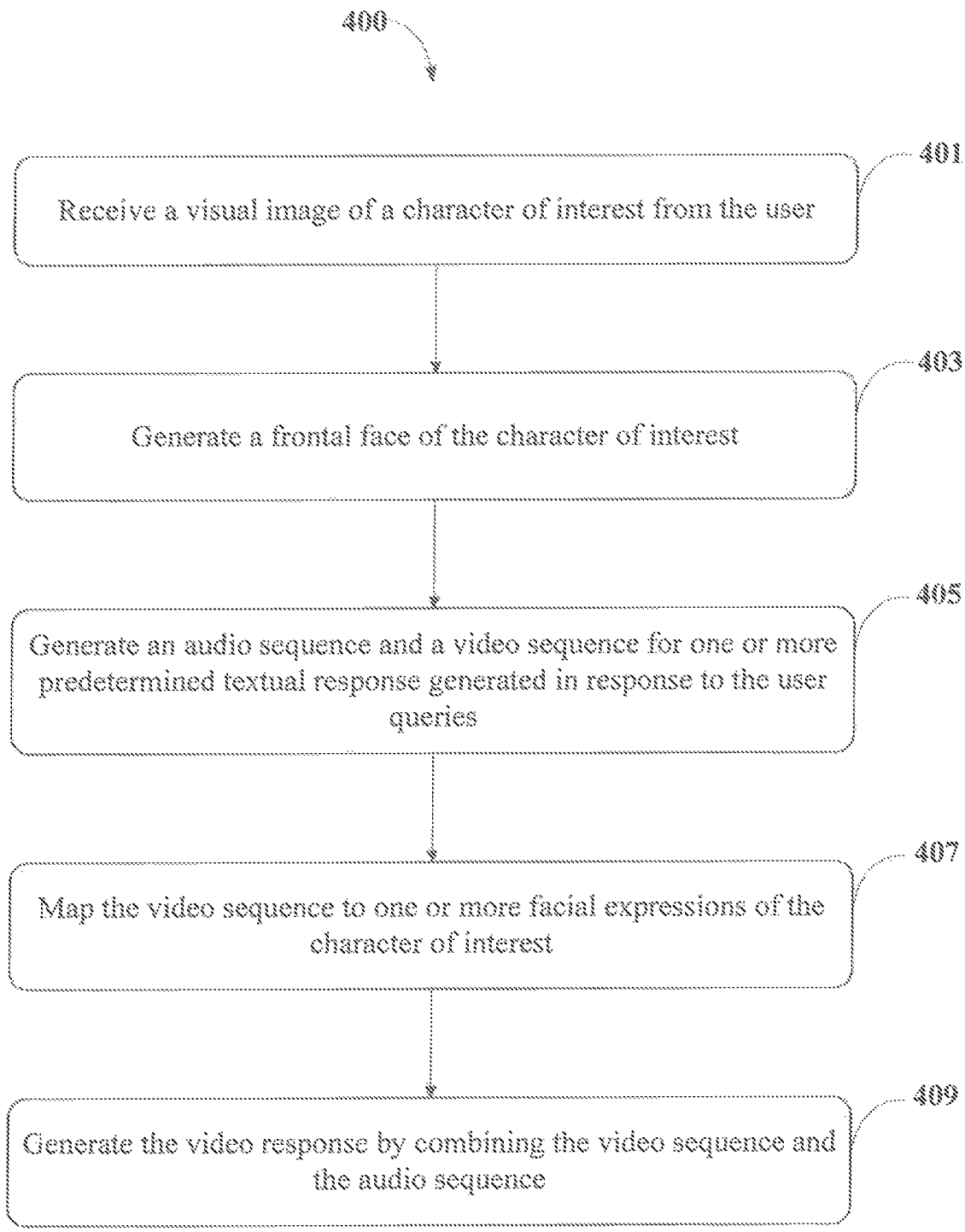
FIG. 4 shows a flowchart illustrating a method of generating video response for the user queries in accordance with some embodiments of the present disclosure.

FIG. 4 shows a flowchart illustrating a method of generating video response 112 for uses queries 107 in accordance with some embodiments of the present disclosure.

As illustrated in FIG. 4, the method 400 includes one or more blocks illustrating a method for generating video response 112 for the user queries 107 using a video generator 101. The method 400 may be described in the general context of computer executable instructions. Generally, computer executable instructions can include routines, programs, objects, components, data structures, procedures, modules, and functions, which perform specific functions or implement abstract data types.

The order in which the method 400 is described is not intended to be construed as a limitation, and arty number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 401, the method 400 includes receiving, by the video generator 101, a visual image 105 of a character of interest from the user 103. As an example, the character of Interest may be favorite actors/actresses of the user 103, favorite movie characters of the user 103 and the like.

At block 403, the method 400 includes generating, by the video generator 101, a frontal face 209 of the character of interest. As an example, the frontal face 209 of the character of interest may include a front view of the face of the character, indicating relative positions of various parts such as nose, eyes, and the like, of the face along with one or more facial expressions of the character of interest. As an example, the one or more facial expressions of the character of interest may include lip movement and eye movement of the character of interest, wherein the lip movement matches pronunciation of the one or more predetermined textual response 109.

At block 405, the method 400 includes generating, by the video generator 101, an audio sequence 110 and a video sequence 111 for one or more predetermined textual response 109 generated in response to the user queries 107. In an embodiment, the video generator 101 may determine gender of the character of interest based on the visual image 105 for modulating vocal rhythm of the audio sequence 110 based on gender of the character of interest.

At block 407, the method 400 includes mapping, by the video generator 101, the video sequence 111 to one or more facial expressions of the character of interest 209. In an embodiment, the video generator 101 maps the video sequence 111 based on training an interacting framework of Convolutional Neural Network (CNN) image encoder, a convolutional Long Short-Term Memory (LSTM) video encoder, a Gated Recurrent Unit (GRU) encoder and a Conditional Pixel CNN (CPCNN) decoder using training data.

At block 409, the method 400 includes generating, by the video generator 101, video response 112 by combining the video sequence 111 and the audio sequence 110. In an embodiment, the video generator 101 may combine the audio sequence 110 and the video sequence 111 by synchronizing the audio sequence 110 with the one or more facial expressions of the character of interest.

Computer System

Figure 5:
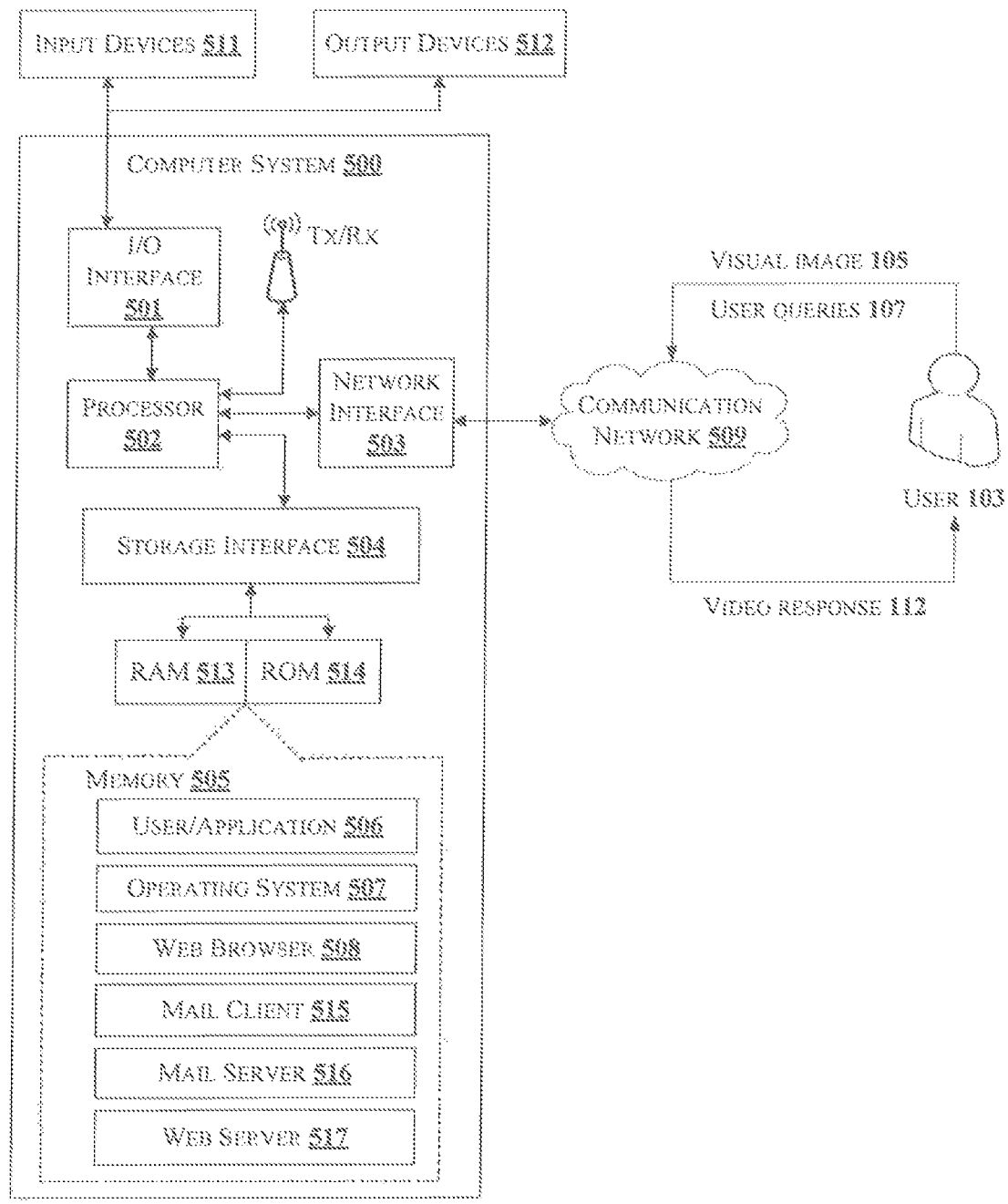
FIG. 5 illustrates a block diagram of an exemplary computer system for implementing embodiments consistent with the present disclosure.

FIG. 5 illustrates a block diagram of an exemplary computer system 500 for implementing embodiments consistent with the present disclosure. In an embodiment, the computer system 500 may be video generator 101 which may be used for generating video response 112 for user queries 107. The computer system 500 may include a central processing unit ("CPU" or "processor") 502. The processor 502 may include at least one data processor for executing program components for executing user- or system-generated business processes. A user may include a person, a customer, a person using a device such as those included in this invention, or such a device itself. The processor 502 may include specialized processing units such as integrated system (bus) controllers, memory management control units, floating point units, graphics processing units, digital signal processing units, etc.

The processor 502 may be disposed in communication with one or more input/output (I/O) devices (511 and 512) via I/O interface 501. The I/O interface 501 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n /b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc.

Using the I/O interface 501, the computer system 500 may communicate with one or more I/O devices (511 and 512). In some embodiments, the processor 502 may be disposed in communication with a communication network 509 via a network interface 503. The network interface 503 may communicate with the communication network 509. The network interface 503 may employ connection protocols including, without limitation, direct connect, Ethernet (e.g., twisted pair 10/100/1000 Base T), Transmission Control Protocol/Internet Protocol (TCP/IP), token ring, IEEE 802.11 a/b/g/n/x, etc.

Using the network interface 503 and the communication network 509, the computer system 500 may communicate with the user for receiving a visual image 105 of a character of interest to the user and user queries 107. Further, the communication network 509 may be used to provide the generated video response 112 to the user. The communication network 509 can be implemented as one of the different types of networks, such as intranet or Local Area Network (LAN) and such within the organization. The communication network 509 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 509 may include a variety of network devices, including routers, bridges, servers, computing devices, storage devices, etc.

In some embodiments, the processor 502 may be disposed in communication with a memory 505 (e.g., RAM 513, ROM 514, etc., as shown in FIG. 5) via a storage interface 504. The storage interface 504 may connect to memory 505 including, without limitation, memory drives, removable disc drives, etc., employing connection protocols such as Serial Advanced Technology Attachment (SATA), Integrated Drive Electronics (IDE), IEEE-1394,Universal Serial Bus (USB), fiber channel, Small Computer Systems Interface (SCSI), etc. The memory drives may further include a drum, magnetic disc drive, magneto-optical drive, optical drive. Redundant Array of Independent Discs (RAID), solid-stare memory devices, solid-state drives, etc.

The memory 505 may store a collection of program or database components, including, without limitation, user/application data 506, an operating system 507, web server 508 etc. In some embodiments, computer system 500 may store user/application data 506, such as the data, variables, records, etc., as described in this invention. Such databases may be implemented as fault-tolerant, relational, scalable, secure databases such as Oracle or Sybase.

The operating system 507 may facilitate resource management and operation of the computer system 500. Examples of operating systems include, without limitation, Apple Macintosh OS X, UNIX, Unix-dike system distributions (e.g., Berkeley Software Distribution (BSD), FreeBSD, Net BSD, Open BSD, etc.), Linux distributions (e.g., Red flat, Ubuntu, K-Ubuntu, etc.), International Business Machines (IBM) OS/2, Microsoft Windows (XP, Vista/7/8, etc.), Apple iOS, Google Android, Blackberry Operating System (OS), or the like. A user interface may facilitate display, execution, interaction, manipulation, or operation of program components through textual or graphical facilities. For example, user interfaces may provide computer interaction interface elements on a display system operatively connected to the computer system 500, such as cursors, icons, check boxes, menus, windows, widgets, etc. Graphical User Interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, JavaScript, AJAX, HTML, Adobe Flash, etc.), or the like.

In some embodiments, the computer system 500 may implement a web browser 508 stored program component. The web browser may be a hypertext viewing application, such as Microsoft internet Explorer, Google Chrome, Mozilla Firefox, Apple Safari, etc. Secure web browsing may be provided using Secure Hypertext Transport Protocol (HTTPS) secure sockets layer (SSL), Transport Layer Security (TLS), etc. Web browsers may utilize facilities such as AJAX, DHTML, Adobe Flash, JavaScript, Java, Application Programming Interfaces (APIs), etc. In some embodiments, the computer system 500 may implement, a mall server stored program component. The mail server 516 may be an Internet mail server such as Microsoft Exchange, or the like. The mail server 516 may utilize facilities such as Active Server Pages (ASP), ActiveX, American National Standards Institute (ANSI) C++/C#, Microsoft .NET, CGI scripts, Java, JavaScript, PERL, PHP, Python, WebObjects, etc. The mail server may utilize communication protocols such as Internet Message Access Protocol (MAP), Messaging Application Programming Interface (MAPI), Microsoft Exchange, Post Office Protocol (POP), Simple Mali Transfer Protocol (SMTP), or the like. In some embodiments, the computer system 500 may implement a mail client 515 stored program component. The mail client 515 may be a mail viewing application, such as Apple Mall, Microsoft Entourage, Microsoft Outlook, Mozilla Thunderbird, etc.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives. Compact Disc (CD) ROMs, Digital Video Disc (DVDs), flash drives, disks, and any other known physical storage media.

Advantages of the Embodiment of the Present Disclosure are Illustrated Herein

In an embodiment, the method of present disclosure generates a human like video response, in response to the user queries.

In an embodiment, the method of present disclosure can synthesize a video with the face of a desired character that speaks out a given paragraph or a piece of text with synchronized lip and eye movements and matching facial expressions.

In an embodiment, the method of present disclosure helps in building a cognitive agent that interacts with the user to resolve his/her queries and issues.

In an embodiment, the present disclosure provides a virtual assistance system for carrying out human-to-human like communications.

In an embodiment, the method of present disclosure can generate a sequenced video response whose voice matches with gender of the character of interest to the user, The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all the items are mutually exclusive, unless expressly specified otherwise.

The terms "a", "an" and "the" mean "one or more", unless expressly specified otherwise. A description of an embodiment with several components in communication with each other does not imply that all such components are required. On the contrary, a variety of optional components are described to illustrate the wide variety of possible embodiments of the invention.

When a single device or article is described herein, it will be clear that more than one device/article (whether they cooperate) may be used in place of a single device/article. Similarly, where more than one device or article is described herein (whether they cooperate), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
| --- | --- |
| 100 | Environment |
| 101 | Video generator |
| 103 | User |
| 105 | Visual image |
| 107 | User queries |
| 109 | Predetermined textual response |
| 110 | Audio sequence |
| 111 | Video sequence |
| 112 | Video response |
| 201 | I/O Interface |
| 203 | Processor |
| 205 | Memory |
| 206 | Data |
| 207 | Modules |
| 209 | Frontal face |
| 211 | Other data |
| 213 | Receiving module |
| 215 | Frontal face generation module |
| 217 | Audio/Video (A/V) sequence generation module |
| 221 | Other modules |
| 500 | Computer system |
| 501 | I/O Interface of the computer system |
| 502 | Processor of the computer system |
| 503 | Network Interface |
| 504 | Storage Interface |
| 505 | Memory of the computer system |
| 506 | User/Application |
| 507 | Operating system |
| 508 | Web interface |
| 509 | Communication network |
| 513 | RAM |
| 514 | ROM |
| 515 | Mail client |
| 516 | Mail server |
| 517 | Web server |

What is claimed is:

1. A method for generating video response for user queries, the method comprising:
 receiving, by a video generator, a visual image of a character of interest from the user;
 generating, by the video generator, a synthesized frontal face of the character of interest;
 generating, by an encoder-decoder logic in the video generator, an audio sequence and a video sequence for one or more predetermined textual responses, wherein the audio sequence and the video sequence are generated by:
  generating a symbolic-token-sequence associated with the one or more predetermined textual responses by mapping an associated symbol to each textual input included in the one or more predetermined textual responses;
  generating a numerical vector representation of the one or more predetermined textual responses by embedding the symbolic-token-sequence in a real-valued vector space, in a character-by-character scanning manner; and
  generating a plurality of video frames with corresponding internal states in a time sequence, by processing the numerical vector representation of the one or more predetermined textual responses and the synthesized-front-face based on an interactive framework,
    wherein the interactive framework enables generation of each video frame with respect to a current-state in time depending on a current-state textual input and on all video frames generated at previous-states in time, and
    wherein the plurality of video frame include the synthesized front face with one or more facial expressions that matches to the textual inputs;
  generating an audio sequence corresponding to the one or predetermined responses using a Wave Net architecture; and
  generating, by the video generator, the video response by combining the video sequence and the audio sequence, for the one or more predetermined textual responses.

2. The method as claimed in claim 1, wherein the one or more facial expressions of the character of interest comprise lip movement and eye movement of the character of interest, wherein the lip movement matches pronunciation of the one or more predetermined textual responses.

3. The method as claimed in claim 1 further comprises determining gender of the character of interest based on the visual image.

4. The method as claimed in claim 1 further comprises modulating vocal rhythm of the audio sequence based on gender of the character of interest.

5. The method as claimed in claim 1, wherein combining the audio sequence and the video sequence further comprises synchronizing the audio sequence with the one or more facial expressions of the character of interest.

6. The method as claimed in claim 1, wherein the encoder-decoder logic is trained using the interacting framework of: Textual Gated Recurrent Unit (TGRU) based Recurrent Neural Network (RNN) video encoder along with following logics: Convolutional Neural Network (CNN) image encoder, and a Conditional Pixel CNN (CPCNN) decoder using training data.

7. The method as claimed in claim 1, wherein the encoder-decoder logic is trained using the interacting framework of: a convolutional Long Short-Term Memory (LSTM) based RNN video encoder along with following logics: Convolutional Neural Network (CNN) image encoder, and a Conditional Pixel CNN (CPCNN) decoder using training data.

8. A video generator for generating video response for user queries, the video generator comprising:
  a processor; and
  a memory communicatively coupled to the processor, wherein the memory stores processor-executable instructions, which, on execution, causes the processor to:
  receive a visual image of a character of interest from the user;
  generate a synthesized frontal face of the character of interest;
  generate an audio sequence and a video sequence for one or more predetermined textual responses wherein the audio sequence and the video sequence are generated by an encoder-decoder logic in the video generator by:
    generating asymbolic-token-sequence associated with the one or more predetermined textual responses by mapping an associated symbol to each textual input included in the one or more predetermined textual responses;
    generating a numerical vector representation of the one or more predetermined textual responses by embedding the symbolic-token-sequence in a real-valued vector space, in a character-by-character scanning manner; and
    generating a plurality of video frames with corresponding internal states in a time sequence, by processing the numerical vector representation of the one or more predetermined textual responses and the synthesized-frontal-face based on an interactive framework,
      wherein the interactive framework enables generation of each video frame with respect to a current-state in time is generated depending on a current-state textual input and all video frames generated at previous -states in time, and
      wherein the plurality of video frame include the synthesized front face with one or more facial expressions that matches to the textual inputs;
  generate an audio, sequence corresponding to the one or predetermined responses using a Wave Net architecture; and
  generate the video response by combining the video sequence and the audio sequence, for the one or more predetermined textual responses.

9. The video generator as claimed in claim 8, wherein the one or more facial expressions of the character of interest comprise lip movement and eye movement of the character of interest, wherein the lip movement matches pronunciation of the one or more predetermined textual responses.

10. The video generator as claimed in 8, wherein the processor is further configured to determine gender of the character of interest based on the visual image.

11. The video generator as claimed in claim 8, wherein the processor is further configured to modulate vocal rhythm of the audio sequence based on gender of the character of interest.

12. The video generator as claimed in claim 8, wherein to combine the audio sequence and the video sequence, the processor is further configured to synchronize the audio sequence with the one or more facial expressions of the character of interest.

13. A non-transitory computer readable medium including instructions stored thereon that when processed by at least one processor cause a video generator to perform operations comprising:
  receiving a visual image of a character of interest from the user;
  generating a synthesized frontal face of the character of interest;

generating an audio sequence and a video sequence for one or more predetermined textual responses wherein the audio sequence and the video sequence are generated by an encoder-decoder logic by:
    generating a symbolic-token-sequence associated with the one or more predetermined textual responses by mapping an associated symbol to each textual input included in the one or more predetermined textual response;
    generating a numerical vector representation of the one or more predetermined textual responses by embedding the symbolic-token-sequence in a real-valued vector space, in a character-by-character scanning manner; and
    generating a plurality of video frames with corresponding internal states in a time sequence, by processing the numerical vector representation of the one or more predetermined textual responses and the synthesized-frontal-face based on an interactive framework,
        wherein the interactive framework enables generation of each video frame with respect to a current-state in time depending on a current-state textual input and on all video frames generated at previous-states in time, and
        wherein each video frame includes the synthesized front face with one or more facial expressions synchronized to the textual inputs;
generating an audio sequence corresponding to the one or predetermined responses using a Wave Net architecture, and generating the video response by combining the video sequence and the audio sequence, for the one or more predetermined textual responses.

* * * * *